United States Patent
Yang et al.

(10) Patent No.: US 9,701,783 B2
(45) Date of Patent: Jul. 11, 2017

(54) POLYDIORGANOSILOXANE POLYURETHANE

(71) Applicant: 3M INNOVATIVE PROPERTIES COMPANY, St. Paul, MN (US)

(72) Inventors: Yu Yang, Eden Prairie, MN (US); Suresh S. Iyer, Woodbury, MN (US); Yongshang Lu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 64 days.

(21) Appl. No.: 14/430,750

(22) PCT Filed: Oct. 25, 2013

(86) PCT No.: PCT/US2013/066791
§ 371 (c)(1),
(2) Date: Mar. 24, 2015

(87) PCT Pub. No.: WO2014/070604
PCT Pub. Date: May 8, 2014

(65) Prior Publication Data
US 2015/0252139 A1    Sep. 10, 2015

Related U.S. Application Data

(60) Provisional application No. 61/719,570, filed on Oct. 29, 2012.

(51) Int. Cl.
| | | |
|---|---|---|
| *C08G 77/458* | (2006.01) | |
| *C08G 18/10* | (2006.01) | |
| *B32B 9/04* | (2006.01) | |
| *B32B 27/28* | (2006.01) | |
| *C08G 18/75* | (2006.01) | |
| *C08G 18/61* | (2006.01) | |
| *C08G 18/24* | (2006.01) | |
| *C09D 183/10* | (2006.01) | |
| *B32B 27/08* | (2006.01) | |

(52) U.S. Cl.
CPC ............ *C08G 18/758* (2013.01); *B32B 27/08* (2013.01); *B32B 27/283* (2013.01); *C08G 18/10* (2013.01); *C08G 18/246* (2013.01); *C08G 18/61* (2013.01); *C09D 183/10* (2013.01); *B32B 2307/308* (2013.01); *B32B 2307/71* (2013.01); *C08G 77/458* (2013.01); *Y10T 428/31507* (2015.04); *Y10T 428/31663* (2015.04)

(58) Field of Classification Search
USPC ...... 428/40.1, 41.8, 447; 427/207.1; 528/28, 528/65
See application file for complete search history.

(56) References Cited

U.S. PATENT DOCUMENTS

| | | | |
|---|---|---|---|
| 4,883,854 A | 11/1989 | Coury | |
| 5,214,119 A | 5/1993 | Leir | |
| 5,512,650 A * | 4/1996 | Leir | ............ C08G 18/61 528/14 |
| 5,670,598 A * | 9/1997 | Leir | ............ C08G 18/289 528/28 |
| 6,355,759 B1 | 3/2002 | Sherman | |
| 6,441,118 B2 | 8/2002 | Sherman | |
| 7,495,119 B2 | 2/2009 | Herzig | |
| 7,501,184 B2 | 3/2009 | Leir | |
| 7,799,434 B2 | 9/2010 | Webster | |
| 2006/0036055 A1 | 2/2006 | Schafer | |
| 2008/0213599 A1 | 9/2008 | Webster et al. | |
| 2008/0318058 A1 | 12/2008 | Sherman | |
| 2010/0210809 A1 | 8/2010 | Simon | |

FOREIGN PATENT DOCUMENTS

| | | |
|---|---|---|
| JP | 2006-142769 | 6/2006 |
| KR | 2011-0021630 | 3/2011 |
| WO | WO 95-03354 | 2/1995 |
| WO | WO 2004-085516 | 10/2004 |
| WO | WO 2008-008077 | 1/2008 |
| WO | WO 2011-065433 | 6/2011 |

OTHER PUBLICATIONS

English abstract of JP 02113015, Apr. 25, 1990, 3 pages, Japan.*
Ekin, "Synthesis, formulation, and characterization of siloxane-polyurethane coatings for underwater marine applications using combinatorial high-throughput experimentation", Journal of Coating Technology and Research, 2007, vol. 4, No. 4, pp. 435-451.
Ekin, "Synthesis and Characterization of Novel Carbamate Linked DI- and Tetra-Functional Poly (Dimethylsiloxane) Oligomers and Their Block Copolymers With Poly (ε-Caprolactone) Using Combinatorial and High-Throughput Methods", Polymer Preprints, 2006, vol. 47, No. 2, pp. 1204-1205.
Novi, "Ammonium-Functionalized Polydimethylsiloxanes: Synthesis and Properties", Macromolecular Chemistry and Physics, 2006, vol. 207, pp. 273-286.
Webster, "High Throughput Screening of Compositional Variables in a Siloxane-Urethane Coatings Systems for Marine Applications", Polymer Preprints, 2007, vol. 48, No. 1, pp. 159-160.
International Search Report for PCT International Application No. PCT/US2013/066791 mailed on Mar. 3, 2014, 4 pages.

* cited by examiner

*Primary Examiner* — Tae H Yoon
(74) *Attorney, Agent, or Firm* — Julie Lapos-Kuchar; Jean Lown

(57) ABSTRACT

Described herein is a polydiorganosiloxane polyurethane, linear, block copolymer and methods of making thereof. The copolymers comprise soft segments that are polydioranosiloxane units and hard segments which are polyurethane residues.

20 Claims, No Drawings

POLYDIORGANOSILOXANE POLYURETHANE

CROSS REFERENCE TO RELATED APPLICATIONS

This application is a national stage filing under 35 U.S.C. 371 of PCT/US2013/066791, filed Oct. 25, 2013, which claims priority to U.S. Provisional Patent Application No. 61/719,570, filed Oct. 29, 2012, the disclosures of which are incorporated by reference in their entirety herein.

TECHNICAL FIELD

Polydiorganosiloxane polyurethane copolymers, articles comprising the copolymers, and methods of making the copolymers are described.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides, polydiorganosiloxane polyureas, and polydiorganosiloxane polyoxamides are exemplary block copolymers.

Polydiorganosiloxane polyamides have been prepared by condensation reactions of amino terminated polydiorganosiloxanes with short-chained dicarboxylic acids. Alternatively, these copolymers have been prepared by condensation reactions of carboxy terminated polydiorganosiloxanes with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than about 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Polydiorganosiloxane polyureas are another type of block copolymer. Although these block copolymers have many desirable characteristics, and involve a one pot preparation, some of the polydiorganosiloxane polyureas tend to degrade when subjected to elevated temperatures such as 250° C. or higher.

Polydiorganosiloxane polyoxamides are another type of block copolymer, wherein the relatively unstable urea link of the polydiorganosiloxane polyurea is replaced with a UV and thermally stable amide link. However, the process of making these polydiorganosiloxane polyoxamides comprises an intermediate isolation and/or purification step, where a polydiorganosiloxane diamine is first treated with a molar excess of diethyl oxalate to cap-off the amine ends and then the unreacted excess is removed. Then, the isolated prepolymer is reacted with a stoichiometric amount of a short chain diamine to get the targeted polydiorganosiloxane polyoxamides.

SUMMARY

There is a desire to identify a polydiorganosiloxane copolymer, which has good thermal and UV stability, that is more cost effective to prepare, specifically a polydiorganosiloxane polymer that can be prepared in a single pot reaction. In another embodiment, it is desirable to provide a polydiorganosiloxane copolymer in which the physical properties (such as glass transition temperature (Tg), hardness, toughness, chemical resistance, etc.) may be selectively tuned. In yet another embodiment, it is desirable to have a polymer, which is optically clear, and/or can be used for coating applications.

In one embodiment, a composition is described comprising a copolymer of Formula (I) (also referred to herein as a polydiorganosiloxane polyurea):

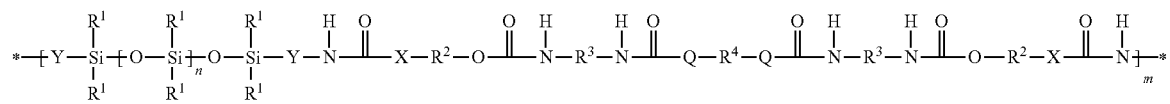

(I)

wherein each $R^1$ is independently an alkyl, haloalkyl, aralkyl, alkenyl, aryl, or aryl substituted with an alkyl, alkoxy, or halo;

each $R^2$ is independently an alkylene, alkylene substituted with an aryl, or a combination thereof;

each $R^3$ is independently an alkylene, arylene, arylene substituted with an alkyl, halo, oxy or carbodiimide-group, haloaralkylene, cycloalkylene, cycloalkylene substituted with an carbodiimide group, or a combination thereof;

each $R^4$ is independently an alkylene, fluoroalkylene, alkylene oxide, aralkylene, fluoroalkylene oxide, or a combination thereof;

each X is independently an oxy or —$CH_2$—;

each Y is independently an alkylene, arylene, or a combination thereof;

Q is oxy or —NH—;

n is an integer in a range of 0 to 1500; and m is an integer equal to at least 1.

In another embodiment, an article is described comprising:

a first substrate; and a polymeric layer adjacent to the substrate, the polymeric layer comprising a copolymer of Formula (I)

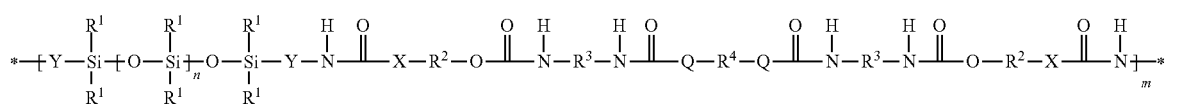
(I)

wherein each $R^1$ is independently an alkyl, haloalkyl, aralkyl, alkenyl, aryl, or aryl substituted with an alkyl, alkoxy, or halo;

each $R^2$ is independently an alkylene, alkylene substituted with an aryl, or a combination thereof;

each $R^3$ is independently an alkylene, arylene, arylene substituted with an alkyl, halo, oxy or carbodiimide group, haloaralkylene, cycloalkylene, cycloalkylene substituted with an carbodiimide group, or a combination thereof;

each $R^4$ is independently an alkylene, fluoroalkylene, alkylene oxide, aralkylene, fluoroalkylene oxide, or a combination thereof;

each X is independently an oxy or —$CH_2$—;

each Y is independently an alkylene, arylene, or a combination thereof;

Q is oxy or —NH—;

n is an integer in a range of 0 to 1500; and m is an integer equal to at least 1.

In yet another embodiment, a method of making a copolymer is described, the method comprising:

(a) providing a polydiorganosiloxane diamine of Formula (II)

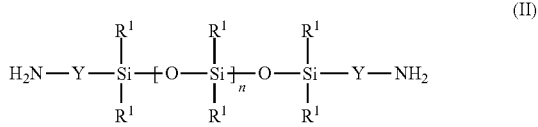
(II)

wherein
each $R^1$ is independently an alkyl, haloalkyl, aralkyl, alkenyl, aryl, or aryl substituted with an alkyl, alkoxy, or halo;
each Y is independently an alkylene, arylene, or a combination thereof; and
n is an integer in a range of 0 to 1500;

(b) reacting the polydiorganosiloxane diamine of Formula (II) with a cyclic compound of Formula (III)

(III)

to form a polydiorganosiloxane diol of Formula (IV)

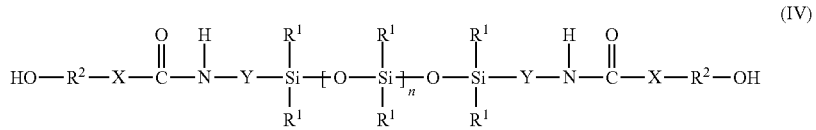
(IV)

wherein
each $R^2$ is independently an alkylene, alkylene substituted with an aryl, or a combination thereof;

(c) reacting the polydiorganosiloxane diol of Formula (IV) with a diisocyante of Formula (V)

$$OCN—R^3—NCO \qquad (V)$$

to form a polydiorganosiloxane diisocyanate of Formula (VI)

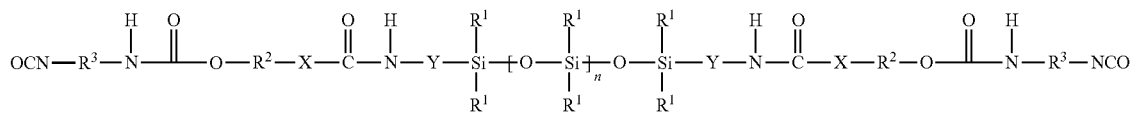
(VI)

wherein
each $R^3$ is independently an alkylene, arylene, arylene substituted with an alkyl, halo, oxy, or carbodiimide group, haloaralkylene, cycloalkylene, cycloalkylene substituted with an carbodiimide group, or a combination thereof; and
(d) reacting the polydiorganosiloxane diisocyanate of Formula (VI) with a chain extender of Formula (VII)

to form the copolymer of Formula (I)

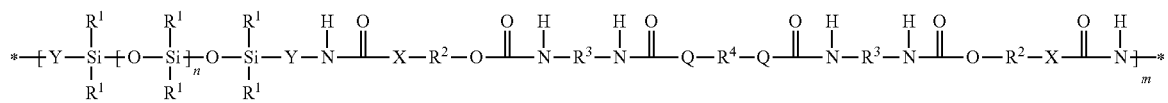

wherein
each $R^4$ is independently an alkylene, fluoroalkylene, alkylene oxide, aralkylene, fluoroalkylene oxide, or a combination thereof;
Q is oxy or —NH—; and
m is an integer equal to at least 1.

The above summary is not intended to describe each embodiment. The details of one or more embodiments of the invention are also set forth in the description below. Other features, objects, and advantages will be apparent from the description and from the claims.

DETAILED DESCRIPTION

Polydiorganosiloxane polyurethane block copolymers, articles comprising the copolymers, and methods of making the copolymers are provided. The polydiorganosiloxane polyurethane copolymers, which are of the $(AB)_n$ type, can be prepared in a single pot reaction without the need to separate or isolate an intermediate product during the synthesis. The copolymers can have many of the desirable features of polydiorganosiloxanes such as low glass transition temperatures, thermal and oxidative stability, resistance to ultraviolet radiation, low surface energy and hydrophobicity, and high permeability to many gases. Additionally, the copolymer can have improved mechanical strength and elastomeric properties compared to polydiorganosiloxane. At least some of the copolymers are optically clear, have a low refractive index, or both.

Definitions

The terms "a", "an", and "the" are used interchangeably and mean one or more elements being described.

The term "and/or" is used to indicate one or both stated cases may occur, for example A and/or B includes, (A and B) and (A or B).

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, 1-propenyl, and 1-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms if linear and 3 to 20 carbon atoms if branched or cyclic. In some embodiments, the alkyl group contains 1 to 18, 1 to 12, 1 to 10, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, ethylhexyl, and octadecyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms. The term "substituted alkylene" refers to an alkylene substituted with one or more groups selected from halo, alkyl, aryl, haloalkyl, alkoxy, or alkoxycarbonyl. An exemplary alkylene substituted with an aryl is —$CH_2CH(C_6H_5)CH_2$—.

The term "alkoxy" refers to a monovalent group of formula —OR where R is an alkyl group.

The term "alkoxycarbonyl" refers to a group of formula —C(=O)OR where R is an alkyl group.

The term "alkylene oxide" refers to a group of formula —R—O— where R is an alkylene such as an alkylene having 1 to 5 carbon atoms, 1 to 4 carbon atoms, or 2 to 3 carbon atoms.

The term "aralkyl" refers to a monovalent group of formula —R—Ar where R is an alkylene and Ar is an aryl group. That is, the aralkyl is an alkyl substituted with an aryl. The term "substituted aralkyl" refers to an aralkyl substituted with one or more groups selected from halo, alkyl, haloalkyl, alkoxy, or alkoxycarbonyl. The aryl portion of the aralkyl is typically the group that is substituted.

The term "aralkylene" refers to a divalent group of formula —R—$Ar^a$— where R is an alkylene and $Ar^a$ is an arylene (i.e., an alkylene is bonded to an arylene).

The term "aryl" refers to a monovalent group that is radical of an arene, which is a carbocyclic, aromatic compound. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, naphthyl, acenaphthyl, anthraquinonyl, phenanthryl, anthracenyl, pyrenyl, perylenyl, and fluorenyl. The term "substituted aryl" refers to an aryl substituted with one or more groups selected from halo, alkyl, haloalkyl, alkoxy, or alkoxycarbonyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "carbonyl" refers to a divalent group of formula —(CO)— where the carbon atom is attached to the oxygen atom with a double bond.

The term "carbodiimide" refers to a divalent group of formula —N=C=N—.

The term "fluoroalkylene" refers to an alkylene, which comprises at least one fluorine atom in place of a hydrogen atom in a CH bond. In one embodiment the fluoroalkylene is perfluorinated, in which all of the hydrogen atoms in the C—H bonds are replaced with fluorine atoms.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "haloaralkyene" refers to an arylene comprising an alkyl group and at least one hydrogen atom replaced with a halo.

The term "oxy" refers to a divalent radical of oxygen (—O—).

The term "polymer" and "polymeric material" refer to both materials prepared from one monomer type such as a homopolymer or to materials prepared from two or more different monomers such as a copolymer, terpolymer, etc. Likewise, the term "polymerize" refers to the process of making a polymeric material that can be a homopolymer, copolymer, terpolymer, etc. The terms "copolymer" and "copolymeric material" refer to a polymeric material prepared from at least two different monomers.

The term "room temperature" refers to temperatures in the range of 20° C. to 25° C.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater than one (e.g., at least 2, at least 4, at least 6, at least 8, at least 10, at least 25, at least 50, at least 100, etc.).

Composition

The present disclosure is directed toward a copolymer of Formula (1)

the repeat unit to another group in the copolymer, such as, for example, another repeat unit of Formula (I) or a terminal group.

Suitable alkyl groups for $R^1$ in Formula (I) typically have 1 to 10, 1 to 6, or 1 to 4 carbon atoms. Exemplary alkyl groups include, but are not limited to, methyl, ethyl, iso-propyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group). Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro).

In some repeat units of Formula (I), at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Suitable alkylene groups for $R^2$ in Formula (I) typically have 1 to 10, 1 to 6, 1 to 4, or 1 to 2 carbon atoms. Exemplary alkylene groups include, but are not limited to, methylene, ethylene, isopropylene, n-propylene, n-butylene, and iso-butylene. Suitable alkylene substituted with an aryl

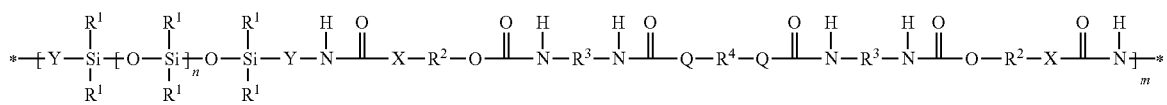

(I)

In this formula, each $R^1$ is independently an alkyl, haloalkyl, aralkyl, alkenyl, aryl, or aryl substituted with an alkyl, alkoxy, or halo. Each $R^2$ is independently an alkylene, alkylene substituted with an aryl, or a combination thereof. Each $R^3$ is independently an alkylene, arylene, arylene substituted with an alkyl, halo, oxy, or carbodiimide group, haloaralkylene, cycloalkylene, cycloalkylene substituted with an carbodiimide group, or a combination thereof. Each $R^4$ is independently an alkylene, fluoroalkylene, alkylene oxide, aralkylene, fluoroalkylene oxide, or a combination thereof. Each X is independently an oxy or —$CH_2$—. Each Y is independently an alkylene, arylene, or a combination thereof. Q is an oxy or —NH—. Subscript n is an integer in a range of 0 to 1500 and subscript m is an integer equal to at least 1. Each asterisk (*) indicates a site of attachment of for $R^2$ in Formula (I) include an aryl group connected to an alkylene group, where the alkylene group typically has 1 to 15, 1 to 10, or 1 to 6 carbon atoms and the aryl group typically has 6 to 12 carbon atoms. Exemplary alkylene groups substituted with an aryl include, but are not limited to an alkylene having 1 to 10 carbon atoms substituted with a phenyl. As used herein with reference to group $R^2$, "a combination thereof" refers to a combination of two or more groups selected from an alkylene and an alkylene substituted with an aryl.

Suitable alkylene groups for $R^3$ in Formula (I) typically have 1 to 10, 1 to 6, 1 to 4, or 1 to 2 carbon atoms. Exemplary alkylene groups include, but are not limited to, methylene, ethylene, isopropylene, n-propylene, n-butylene, and iso-butylene. Suitable arylenes typically have 6 to 12 carbon atoms. Exemplary arylenes include, but are not limited to, phenylene. The arylene group can be unsubstituted or substituted with an alkyl (e.g., an arylene group with 6 to 12 carbon atoms bonded to an alkylene group with 1 to 10 carbon atoms, 1 to 6 carbon atoms, or 1 to 4 carbon atoms), an oxy (e.g., an arylene having 1 to 10 carbon atoms, 1 to 6 carbon atoms, or 1 to 4 carbon atoms and at least on oxygen atom), halo (e.g., chloro, bromo, or fluoro), or a carbodiimide group. Suitable haloaralkylenes typically have 3 to 20 carbon atoms and 1 to 5 halogen atoms include an aryl group, an alkyl group and a halogen. Suitable cycloalkylenes typically have 3 to 12 carbon atoms. Exemplary cycloalkylenes include, but are not limited to cyclohexylene. The cycloalkylenes group can be unsubstituted or substituted with a carbodiimide group. As used herein with reference to group $R^3$, "a combination thereof" refers to a combination of two or more groups selected from an alkylene, arylene, aralkylene, haloarylene, haloaralkylene, oxyarylene, and cycloalkylene. A combination can be, for example, an arylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Suitable alkylene groups for $R^4$ in Formula (I) typically have 1 to 10, 1 to 6, 1 to 4, or 1 to 2 carbon atoms. Exemplary alkylene groups include, but are not limited to, methylene, ethylene, isopropylene, n-propylene, n-butylene, and iso-butylene. Suitable fluoroalkylene groups typically have 1 to 10, 1 to 6, 1 to 4, or 1 to 2 carbon atoms. Exemplary fluoroalkylene groups include, but are not limited to, perfluoromethylene, perfluoroethylene, perfluoropropylene, and perfluorobutylene. Suitable alkylene oxide typically have 1 to 10, 1 to 6, 1 to 4, or 1 to 2 carbon atoms and at least 1, 2, or even 3 oxygen atoms. Exemplary alkylene oxides include, but are not limited to —$CH_2CH_2OCH_2CH_2$—, and $CH_2CH(CH_3)OCH_2CH(CH_3)$—. Suitable fluoroalkylene oxide typically have 1 to 10, 1 to 6, 1 to 4, or 1 to 2 carbon atoms and at least 1, 2, or even 3 oxygen atoms. Exemplary fluoroalkylene oxide-containing materials include, but are not limited to hexafluoropropylene oxide oligomer alcohol, —$CH_2CF_2O(CF_2CF_2)_mO(CF_2)_mOCF_2CH_2$—, and —$CH_2CF_2CF_2O(CF_2CF_2CF_2)_mOCF_2CF_2CH_2$—, wherein n is an integer of at least one and m is an integer of at least one. Suitable aralkylene groups usually have an arylene group with 6 to 12 carbon atoms bonded to an alkylene group with 1 to 10 carbon atoms. In some exemplary embodiments, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group $R^4$, "a combination thereof" refers to a combination of two or more groups selected from an alkylene, fluoroalkylene, alkylene oxide, aralkylene, and fluoroalkylene oxide.

Each Y in Formula (I) is independently an alkylene, arylene, or a combination thereof. Suitable alkylene groups typically have up to 10 carbon atoms, up to 8 carbon atoms, up to 6 carbon atoms, or up to 4 carbon atoms. Exemplary alkylene groups include, but are not limited to, methylene, ethylene, propylene, and butylene. Suitable arylenes typically have 6 to 12 carbon atoms. Exemplary arylenes include, but are not limited to, phenylene. As used herein with reference to group Y, "a combination thereof" refers to a combination of two or more groups selected from an alkylene and arylene group, for example aralkylene and alkarylene groups.

Each subscript n in Formula (I) is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

Each subscript m in Formula (I) is independently an integer of 1 to 10. For example, the value of m is often an integer up to 9, up to 8, up to 7, up to 6, up to 5, up to 4, up to 3, or up to 2. The value of m can be in the range of 1 to 8, 1 to 6, or 1 to 4.

The polydiorganosiloxane polyurethane is a linear, block copolymer and can be an elastomeric material. Unlike many of the known polydiorganosiloxane polyurethanes that are generally formulated as brittle solids or hard plastics, the polydiorganosiloxane polyurethanes can be formulated to include greater than 50 weight percent polydiorganosiloxane segments (i.e., segments containing the [—O—Si($R^1$)$_2$—] repeat unit) based on the weight of the copolymer. The weight percent of the polydiorganosiloxane in the polydiorganosiloxane polyurethanes can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyurethanes. Higher amounts of the polydiorganosiloxane can be used to prepare elastomeric materials with lower modulus while maintaining reasonable strength.

Some of the polydiorganosiloxane polyurethanes can be heated to a temperature up to 160° C., up to 180° C., up to 200° C., up to 220° C., or up to 230° C., without noticeable degradation of the material. For example, when heated in a thermogravimetric analyzer in the presence of air, the copolymers often have less than a 10 percent weight loss when scanned at a rate 50° C. per minute in the range of 20° C. to about 200° C. Additionally, the copolymers can often be heated at a temperature such as 150° C. for 1 hour in air without apparent degradation as determined by no detectable loss of mechanical strength upon cooling.

The copolymer of Formula (I) can be optically clear. As used herein, the term "optically clear" refers to a material that is clear to the human eye. An optically clear copolymeric material often has a luminous transmission of at least 85%, at least 90%, at least 95%, at least 99% or even at least 100%; a haze of less than about 10%, less than about 8%, less than about 5%, less than about 2%, or even less than about 1%; and opacity of less than about 1 percent in the 400 to 700 nm wavelength range. Both the luminous transmission and the haze can be determined using, for example, the method of ASTM-D 1003-11e1.

Additionally, the copolymer of Formula (I) can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of about 1.41 to about 1.50.

Methods of Making

The linear block copolymers having repeat units of Formula (I) can be prepared, for example, using the processes as represented in Reaction Schemes A-C below.

In one embodiment, Reaction Scheme A can be conducted using a plurality of polydiorganosiloxane diamines of Formula II and a plurality of cyclic compounds of Formula III. A plurality of polydiorganosiloxane diamines having differ-

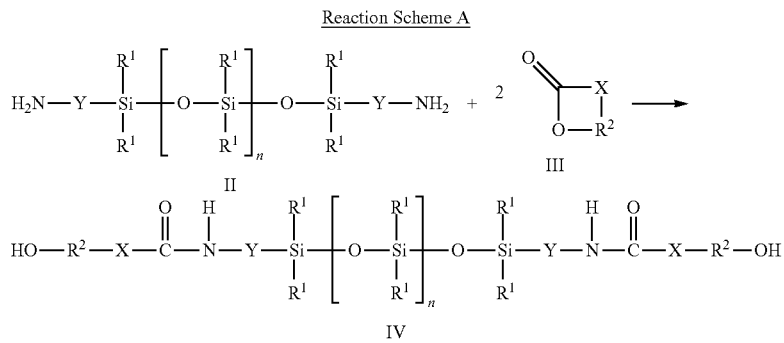

Reaction Scheme A

In Reaction Scheme A, a polydiorganosiloxane diamine according to Formula II is combined under reaction conditions with a cyclic compound according to Formula III to form the polydiorganosiloxane diol of Formula IV, which as shown in Reaction Schemes B and C below, will undergo further reaction to form the polydiorganosiloxane polyurethanes of the present disclosure.

The cyclic compound according to Formula III has at least two oxygen atoms. The cyclic compound may be a cyclic ester (wherein X is —$CH_2$—) or a cyclic carbonate ester (wherein X is —O—). Group $R^2$ is an alkylene, alkylene substituted with an aryl, or a combination thereof. Group $R^2$ is the same as describe in Formula (I). Exemplary cyclic compounds according to Formula III, include, but are not limited to, lactones comprising 2 to 10, 2 to 8, or even 2 to 6 carbon atoms, such as β-propiolactone, γ-butyrolactone, δ-valerlactone, and caprolactone; and cyclic carbonate esters, for example, alkylene carbonates comprising 2 to 10, 2 to 8, or even 2 to 6 carbon atoms, such as ethylene carbonate, propylene carbonate, and butylene carbonate.

Formula II in Reaction Scheme A is a polydiorganosiloxane diamine which can be prepared using techniques known in the art. In one embodiment, the polydiorganosiloxane diamine has a number average molecular weight of 500 to 150,000 grams/mole. In one embodiment, the polydiorganosiloxane diamine has a number average molecular weight of 500 to 10,000; 1,000 to 9,000; or 2,000 to 6,000. In one embodiment, the polydiorganosiloxane diamine has a number average molecular weight of 20,000 to 100,000; 25,000 to 75,000; or 20,000 to 50,000. Examplary polydiorganosiloxane diamines useful in the present invention include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl) methylsiloxane diamine, mixtures and copolymers thereof.

Formula II in Reaction Scheme A is a polydiorganosiloxane diamine where $R^1$, Y, and subscript n are the same as described for Formula (I). In Reaction Scheme A, Formula II can include a single compound (i.e., all the compounds have the same value of n) or can include a plurality of compounds (i.e., the compounds have different values for n). Precursors with different n values have siloxane chains of different length.

ent average molecular weights can be combined under reaction conditions with a single cyclic compound or with multiple cyclic compounds. For example, the polydiorganosiloxane diamines of Formula II may include a mixture of materials with different values of n. The multiple cyclic compounds of Formula III can include, for example, a first cyclic compound that is a lactone and a second cyclic compound that is a carbonate ester.

The molar ratio of the polydiorganosiloxane diamines of Formula II to the cyclic compound of Formula III is often about 1:2. For example, the molar ratio is often less than or equal to 1:1.80, less than or equal to 1:1.85, less than or equal to 1:1.90, less than or equal to 1:1.95, or less than or equal to 1:2. The molar ratio is often greater than or equal to 1:2.05, greater than or equal to 1:2.10, or greater than or equal to 1:2.5. For example, the molar ratio can be in the range of 1:1.80 to 1:2.20, in the range of 1:1.80 to 1:2.15, in the range of 1:1.80 to 1:2.10, in the range of 1:1.80 to 1:2.05, in the range of 1:1.90 to 1:2.10, or in the range of 1:1.95 to 1:2.05. Varying the molar ratio can be used, for example, to affect the time of the reaction. Preferably, one may desire to use a slight excess of the cyclic compound of Formula III to drive the reaction to favor the products. Advantageously, in the present disclosure, unreacted excess cyclic compound of Formula III does not need to be removed from the reaction vessel upon completion of Reaction A.

The reaction of the polydiorganosiloxane diamine of Formula II with the cyclic compound of Formula III (i.e., Reaction Scheme A) are often conducted at room temperature or at elevated temperatures such as at temperatures up to about 200° C. For example, the reaction may be conducted at room temperature or at temperatures up to about 200° C. For example, the reaction temperature is often in the range of room temperature to 60° C., in the range of 35° C. to 50° C., or in the range of 60° C. to 150° C., or even in the range of 80° C. to 120° C. The reaction temperature used and the molecular weight of the polydiorganosiloxane diamine can impact the rate of reaction, with higher molecular weights and lower temperatures taking longer. Typically, the reaction is often complete in less than 4 hours, in less than 8 hours, or in less than 12 hours.

Reaction Scheme A can occur in the presence or absence of a solvent. Typically a solvent is needed when using higher molecular weight polydiorganosiloxane diamine to aid in the reaction.

After forming the polydiorganosiloxane diol of Formula IV, the polydiorganosiloxane diol of Formula IV is reacted with a diisocyanate of Formula V to form a polydiorganosiloxane diisocyanate of Formula VI, which is then reacted with a chain extender of Formula VII to form the polydiorganosiloxane polyurethane of the present disclosure (i.e., copolymer of Formula (I)). This reaction is shown in Reaction Schemes B and C, below.

example, less than 0.85, less than 0.6, less than 0.5, or even less than 0.4 moles of polydiorganosiloxane diol of Formula IV to 1 mole of the diisocyanate may be used.

The polydiorganosiloxane diols of Formula IV with the diisocyanate of Formula V (i.e., Reaction Scheme B) are often conducted at room temperature or at elevated temperatures such as at temperatures up to about 100° C. For example, the reaction often can be conducted at room Reaction Scheme B

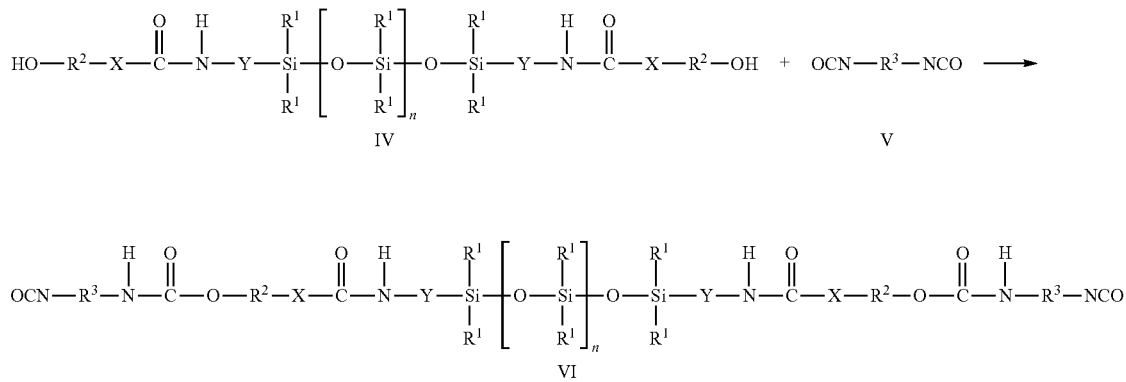

In Reaction Scheme B, the polydiorganosiloxane diol of Formula IV is combined under reaction conditions with a diisocyanate to form the polydiorganosiloxane diisocyanate of Formula VI.

The diisocyanate according to Formula V has only two isocyanate groups so that the resulting polydiorganosiloxane diisocyanate is linear. Group $R^3$ is independently an alkylene; arylene; arylene substituted with an alkyl, halo, oxy or carbodiimide group; haloaralkylene; cycloalkylene; cycloalkylene substituted with an carbodiimide group; or a combination thereof. Group $R^3$ is the same as describe in Formula (I). Exemplary diisocyanates according to Formula V, include but are not limited to, 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) biphenylmethane, 4,4'-diisocyanato-3,3'-dimethoxybiphenyl(o-dianisidine diisocyanate), 5-chloro-2,4-toluene diisocyanate, 1-chloromethyl-2,4-diisocyanato benzene, m-xylylene diisocyanate, tetramethyl-m-xylylene diisocyanate, 1,4-diisocyanatobutane, 1,6-diisocyanatohexane, 2,2,4-trimethylhexyl diisocyanate, 1,12-diisocyanatododecane, 2-methyl-1,5-diisocyanatopentane, methylenedicyclohexylene-4,4'-diisocyanate, and 3-isocyanatomethyl-3,5,5-trimethylcyclohexyl isocyanate, isophorone diisocyanate, hexamethyl diisocyanate, and mixtures thereof.

In one embodiment, Reaction Scheme B can be conducted using a plurality of polydiorganosiloxane diols of Formula IV and/or a plurality of diisocyanates of Formula V.

The molar ratio of the polydiorganosiloxane diols of Formula IV to the diisocyanates of Formula V is often less than 1 (in other words, an excess of diisocyanate), For temperature or at temperatures up to about 100° C. For example, the reaction temperature is often in the range of room temperature to 100° C., in the range of 35° C. to 90° C., or in the range of 40° C. to 80° C.

Reaction Scheme B can occur in the presence or absence of a solvent.

A catalyst may or may not be used in Reaction Scheme B. If a catalyst is used, it is used in a catalytically effective amount, typically, less than 1%, less than 0.1%, less than 0.01% or even less than 0.001% weight per total weight of raw material. Exemplary catalysts include those known in the art to catalyze polyurethane polymerizations, including, for example, amine compounds and organometallic complexes. Exemplary amine compounds include, but are not limited to, triethylenediamine, dimethylcyclohexylamine, dimethylethanolamine, tetramethylbutanediamine, pentamethyldipropylenetriamine, and N-(3-dimethylaminopropyl)-N,N-diisopropanolamine, 1,3,5-(tris(3-dimethylamno)propyl)-hexahydro-s-triazine, bis-(2-dimethylaminoethyl)ether, N-ethylmorpholine, triethylamine, pentamethyldiethylenetriamine, benzyldimethylamine, N,N,N'-trimethyl-N'-hydroxyethyl-bis(aminoethyl)ether, and N'-(3-(dimethylamino)propyl)-N,N-dimethyl-1,3-propanediamine.

Exemplary organometallic complexes compounds include those based on mercury, lead, tin, bismuth and zinc. Such complexes include, but are not limited to, dibutyl tin dilurate, dioctyltin mercaptide, and dibutyltin oxide.

After forming the polydiorganosiloxane diisocyanate of Formula VI, the polydiorganosiloxane diisocyanate of Formula VI is then reacted with a chain extender of Formula VII to form the polydiorganosiloxane polyurethane of the present disclosure (i.e., copolymer of Formula (I)). This reaction is shown in Reaction Scheme C, below.

Reaction Scheme C

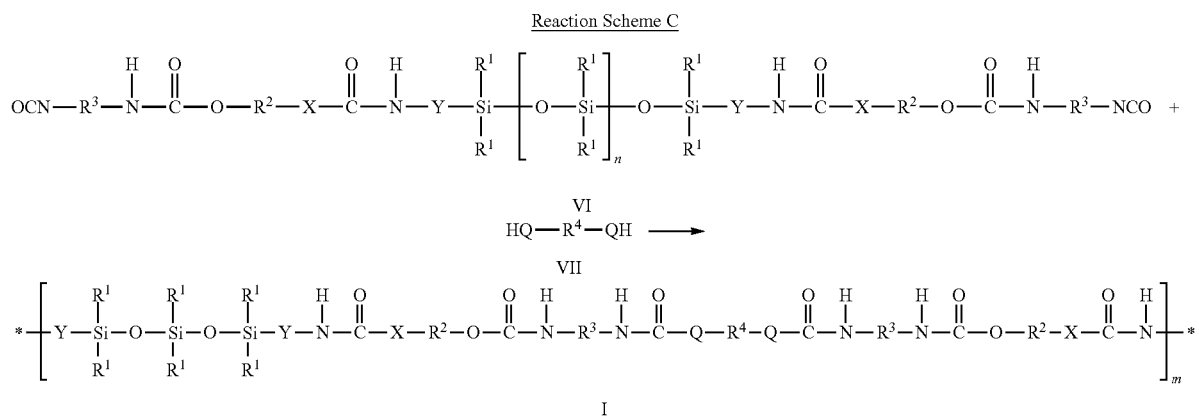

I

In Reaction Scheme C, the polydiorganosiloxane diisocyanate of Formula VI, is combined under reaction conditions with a chain extender to form the copolymer of Formula (I).

The chain extender according to Formula VII has only two reactive groups, Q, so that the resulting copolymer is linear. Group $R^3$ and Q are the same as described in Formula (I). The chain extender may comprise, a —NH— group, an —O— group, or both a —NH— and —O— group. Exemplary chain extenders according to Formula VII, include, but are not limited to 1,4-butanediol; 1,3-propanediol; 1,6-hexanediol; and 1,3-cyclohexanedimethanol; and 1,4-cyclohexanedimethanol.

In one embodiment, Reaction Scheme C can be conducted using a plurality of polydiorganosiloxane diisocyanates of Formula VI and a plurality of chain extenders of Formula VII.

The molar ratio of the polydiorganosiloxane diisocyanates of Formula VI to the chain extenders of Formula VII is often about 1:1. For example, the molar ratio is often less than or equal to 1:0.80, less than or equal to 1:0.85, less than or equal to 1:0.90, less than or equal to 1:0.95, or less than or equal to 1:1. The molar ratio is often greater than or equal to 1:1.05, greater than or equal to 1:1.10, or greater than or equal to 1:1.5. For example, the molar ratio can be in the range of 1:0.80 to 1:1.20, in the range of 1:0.80 to 1:1.15, in the range of 1:0.80 to 1:1.10, in the range of 1:0.80 to 1:1.05, in the range of 1:0.90 to 1:1.10, or in the range of 1:0.95 to 1:1.05. Varying the molar ratio can be used, for example, to alter the overall molecular weight, which can affect the rheology of the resulting copolymers, and the hardness of the resulting block copolymer.

The reaction of the polydiorganosiloxane diisocyanates of Formula VI with the chain extenders of Formula VII (i.e., Reaction Scheme C) are often conducted at room temperature or at elevated temperatures such as at temperatures up to about 100° C. For example, the reaction often can be conducted at room temperature or at temperatures up to about 110° C. For example, the reaction temperature is often in the range of room temperature to 110° C., in the range of 35° C. to 100° C., or in the range of 50° C. to 90° C.

Reaction Scheme C can occur in the presence or absence of a solvent.

A catalyst as described in Reaction B above may or may not be used.

Advantageously, Reactions A, B, and C described above may be carried out in the same reaction vessel (or pot), without the need to isolate intermediate products (e.g., the polydiorganosiloxane diol of Formula IV or the polydiorganosiloxane diisocyanate of Formula VI). For example, unreacted reagents, such as the cyclic compound or the diisocyanate should not undergo side reactions and/or form undesirable side products in the subsequent reaction steps, enabling a single pot reaction.

While a solventless process for making the copolymers has many advantages over a solvent process, there may be some situations where the solvent process is preferred or where a combination of the two is preferred. If a solvent is used, the solvent can be present throughout the subsequent reactions (for example a solvent may be added during Reaction A and not removed until after the formation of the polydiorganosiloxane polyurethane). Suitable solvents usually do not react with any of the reactant or products of the reactions. Additionally, suitable solvents are usually capable of maintaining all of the reactants and all of the products in solution throughout the reaction. Exemplary solvents include, inert polar solvent such as methyl ethyl ketone, toluene, tetrahydrofuran, ethyl acetate, dichlorometane, aliphatic hydrocarbons (e.g., alkanes such as hexane), or mixtures thereof. Any solvent that is present can be stripped from the product (e.g., resulting copolymer of Formula (I) at the completion of the reaction). The stripping process is often conducted at a temperature of at least 100° C., at least 125° C., or at least 150° C. The stripping process is typically at a temperature less than 300° C., less than 250° C., or less than 225° C.

Any suitable reactor or process can be used to prepare the copolymeric material of the present disclosure. The reaction can be conducted using a batch process, semi-batch process, or a continuous process. Exemplary batch processes can be conducted in a reaction vessel equipped with a mechanical stirrer such as a Brabender mixer, provided the product of the reaction is in a molten state has a sufficiently low viscosity to be drained from the reactor. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

In many processes, the components are metered and then mixed together to form a reaction mixture. The components can be metered volumetrically or gravimetrically using, for example, a gear, piston or progressing cavity pump. The components can be mixed using any known static or dynamic method such as, for example, static mixers, or compounding mixers such as single or multiple screw extruders. The reaction mixture can then be formed, poured, pumped, coated, injection molded, sprayed, sputtered, atomized, stranded or sheeted, and partially or completely polymerized. The partially or completely polymerized material can then optionally be converted to a particle, droplet, pellet, sphere, strand, ribbon, rod, tube, film, sheet, coextruded film, web, non-woven, microreplicated structure, or other continuous or discrete shape, prior to the transformation to solid polymer. Any of these steps can be conducted in the presence or absence of applied heat. In one exemplary process, the components can be metered using a gear pump, mixed using a static mixer, and injected into a mold prior to solidification of the polymerizing material.

Properties and Uses

In the above described process, the cyclic compounds of Formula III, the diisocyanate of Formula V and the chain extenders of Formula VII are sequentially added to the reaction, enabling the formation of a linear block copolymer resulting in a regio-regular polymer (in other words, the block regularly repeats in the polymer). The copolymer of the present disclosure (i.e., copolymer of Formula (I)) comprises at least one block of polypolydiorganosiloxane and at least one block of a polyurethanes, wherein the polyurethane block comprises six —NH(C=O)— groups. During the reaction schemes described above, more than one of each of the reactants may be used to achieve the desired properties. For example, the polydiorganosiloxane diamine of Formula II may comprise different molecular weights (i.e., more than one value for the integer n). Likewise, the reaction may comprise multiple types of chain extenders, diisocyanates, and/or cyclic compounds of Formula III.

The copolymers of the present disclosure may be "tuned" to achieve the desired performance characteristics. Specific characteristics of the copolymers of the present disclosure can be influenced by a number of factors including 1) the molecular weight of the polydiorganosiloxane diamine used, 2) type of isocyanate used, 3) type of chain extender used, 4) type of cyclic compound used, and 5) number of urethane linkages in a row.

The molecular weight of the polydiorganosiloxane diamine used can influence the properties of the resulting copolymer such as elasticity and Tg (glass transition temperature). For example, lower molecular weight diamines result in copolymers having higher modulus and higher tensile strength when cured. While, higher molecular weight diamines provide copolymers having lower modulus, but higher strain at break.

The nature of the isocyanate residue in the resulting copolymer influences stiffness and flow properties, and also affects the properties of the cured copolymers. For example, if the diisocyanate contains a ring structure, the resulting copolymer will have a higher Tg and/or be more stiff. If the diisocyanate is aliphatic, the resulting copolymer should have improved weatherablilty. Further, isocyanate residues resulting from diisocyanates that form crystallizable ureas, such as tetramethyl-m-xylylene diisocyanate, 1,12-dodecane diisocyanate, dianisidine diisocyanate, provide copolymers that are stiffer than those prepared from methylenedicyclohexylene-4,4'-diisocyanate, 3-isocyanatomethyl-3,5,5-trimethylcyclohexyl isocyanate, and m-xylylene diisocyanate.

The nature and amounts of the chain-extender used can affect the final properties of the polydiorganosiloxane polyurethane. That is, the amount of the chain extender can be varied advantageously to provide elastomeric materials with a range of properties. For example, a higher amount of the chain extender can alter the melt rheology (e.g., the elastomeric material can flow easier when present as a melt), alter the softness of the elastomeric material, lower the modulus of the elastomeric material, or a combination thereof.

The nature of the residue of the cyclic compound in the resulting copolymer influences the stiffness of the copolymer, with those comprising an $R^2$ being cyclic or short, resulting in a harder material.

Fillers, tackifying resins, plasticizers, and other property modifiers may be incorporated in the copolymers of the present disclosure. Generally, such modifiers are used in amounts ranging up to about 80 weight percent based on the total weight. Additives such as dyes, pigments, stabilizers, antioxidants, compatibilizers, and the like can also be incorporated into the copolymers of the present disclosure. Generally, such additives are used in amounts ranging up to about 20 weight percent based on the total weight.

The polydiorganosiloxane polyurethanes are soluble in many common organic solvents such as, for example, toluene, tetrahydrofuran, dichloromethane, aliphatic hydrocarbons (e.g., alkanes such as hexane), or mixtures thereof.

The polydiorganosiloxane polyurethane polymers of the present disclosure can be cast from solvents as film, molded or embossed in various shapes, or extruded into films. The high temperature stability of the copolymeric material makes them well suited for extrusion methods of film formation. The films can be optically clear.

Various articles are provided that contain the copolymers of Formula (I). For example, the polydiorganosiloxane polyurethane polymers of the present disclosure may be used as a coating composition or an adhesive.

The article, for example, can include a layer containing the copolymer of Formula (I) and one or more optional substrates. For example, the copolymer of Formula (I) can be in a layer adjacent to a first substrate or positioned between a first substrate and a second substrate. That is, the article can be arranged in the following order: a first substrate, a layer containing the copolymer of Formula (I), and a second substrate. Such substrates may include for example, polypropylene, PET (polyethylene terephalate), polycarbonate, acrylates, PMMA (polymethylmethacrylate), PVC (polyvinyl chloride), nylon, and combinations thereof. As used herein, the term "adjacent" refers to a first layer that contacts a second layer or that is positioned in proximity to the second layer, but separated from the second layer by one or more additional layers. In one embodiment, the copolymer of the present disclosure has good adhesion to a substrate.

The polydiorganosiloxane polyurethanes can be formulated into adhesive compositions such as pressure sensitive adhesives and heat activated adhesives that contain a tackifier.

Additionally, the polydiorganosiloxane polyurethanes can be used as a hot melt adhesive. Typically, the hot melt adhesive contains little or no tackifier. The hot melt adhesives can be used, for example, to bond two surfaces together into a composite. That is, the hot melt adhesive can be used to bond a first substrate to a second substrate with the hot melt adhesive positioned between the first and second substrates. During application to a surface such as the surface of a substrate, hot melt adhesives are desirably sufficiently fluid to wet the surface completely and leave no voids, even if the surface is rough. Such an adhesive composition typically has a low viscosity at the time of application and then sets into a solid upon cooling. The cohesive strength develops upon cooling. Alternatively, the hot melt adhesive composition can be formulated with a solvent or carrier that lowers the viscosity sufficiently to permit wetting of the surface. The solvent or carrier can then be removed to provide a solid coating having cohesive strength.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, min=minutes, mol=mole; ml=milliliter, L=liter, and wt=weight.

Materials

| Designation | Description |
|---|---|
| SD1 | polydimethylsiloxane diamine with $M_n$ of about 5190-5206, which can be prepared as described in U.S. Pat. No. 5,214,119 |
| SD2 | polydimethylsiloxane diamine with $M_n$ of about 33788, which can be prepared as described in U.S. Pat. No. 6,355,759 |
| SD3 | polydimethylsiloxane diamine, Mw = 11496, obtained from Wacker Chemie AG, Munich, Germany under the trade designation "WACKER FLUID NH 130D" (the chemical serials number) |
| Ethylene carbonate | obtained from Sigma-Aldrich Chemical Company, St. Louis, MO |
| Toluene | obtained from Sigma-Aldrich Chemical Company, St. Louis, MO |
| THF | Tetrahydrofuran, obtained from Sigma-Aldrich Chemical Company, St. Louis, MO |
| Methylene-bis(4-cyclohexyl-isocyanate) | Molecular weight of 262.4, obtained from Sigma-Aldrich Chemical Company, St. Louis, MO |
| Dibutyltin dilaurate | obtained from Sigma-Aldrich Chemical Company, St. Louis, MO |
| 1,4-butyl diol | obtained from Sigma-Aldrich Chemical Company, St. Louis, MO |
| Caprolactone | 99% obtained from Sigma-Aldrich Chemical Company, St. Louis, MO |

Test Methods

The nuclear magnetic resonance (NMR) spectra of the samples were obtained using an NMR spectrometer (Mercury Plus 600 spectrometer, Varian Inc., Palo Alto, Calif.) with $CDCl_3$ as the solvent and tetramethylsilane (TMS) as the internal standard.

The infrared (IR) spectra of the samples were obtained using a infrared Fourier Transform spectrometer (Nicolet 6700 FT-IR Spectrometer, Thermo Scientific, Madison, Wis.).

The haze (% H) of the polymer film samples (3 cm×3 cm×0.25 mm thickness) were determined following a similar procedure as described in ASTM D 1003-11e1 "Standard Test Method for Haze and Luminous Transmittance of Transparent Plastics" with a transparency meter (Haze-Gard Plus transparency meter, BYK-Gardner USA, Columbia, Md.).

Preparative Example 1 (PE1)

SD1 (26.03 g, 0.005 mol) and ethylene carbonate (0.934 g, 0.0105 mol) were charged into a 500 mL flask under a nitrogen atmosphere. The solution was heated to 50° C. for 4 hours to form the desired diol. Completion of the reaction was confirmed by NMR spectrometry. The reaction is shown in the scheme below:

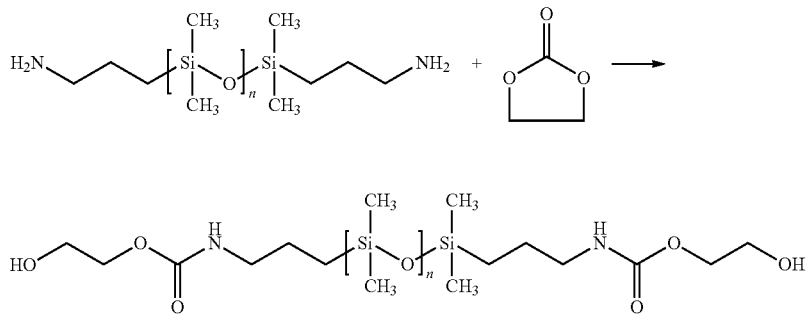

Preparative Example 2 (PE2)

SD2 (1351.52 g, 0.04 mol) and ethylene carbonate (7.5 g, 0.084 mol) and 200 mL THF solvent were charged into in a 5 L flask under a nitrogen atmosphere. The solution was heated to 60° C. for 3 days to form the desired diol. Completion of the reaction was confirmed by NMR spectrometry.

Preparative Example 3 (PE3)

SD3 (0.02 mol, 229.92 g) and ethylene carbonate (0.065 mol, 5.74 g) was charged into in a 500 mL flask under nitrogen atmosphere. The solution was heated to 50° C. for 24 hours to form the desired diol. Completion of the reaction was confirmed by NMR spectrometry.

Preparative Example 4 (PE4)

SD1 (26.03 g, 0.005 mol) and caprolactone (1.21 g, 0.0105 mol), were mixed in a 100 mL flask. The solution was stirred at room temperature overnight, and then at 40° C. for 4 hours to form the desired diol. IR spectrum of the material showed absorption bands at 1647 $cm^{-1}$ and 1540 $cm^{-1}$ corresponding to the amide functionality. The reaction is shown in the scheme below:

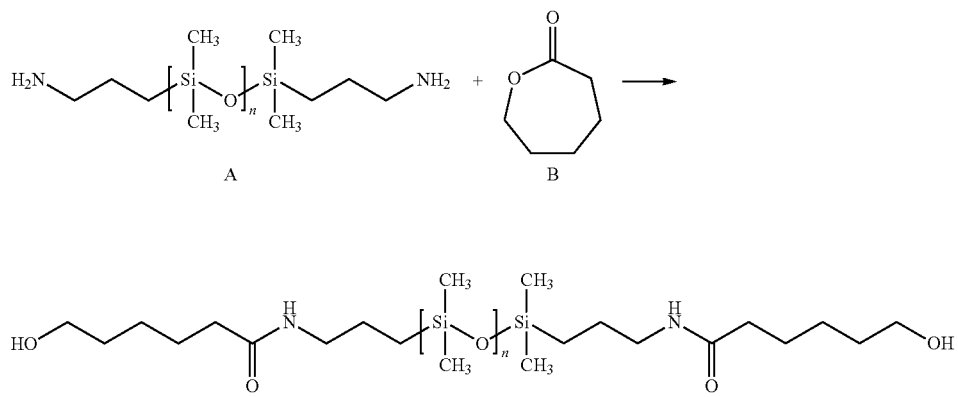

Example 1

Polydiorganosiloxane diol (Mw=5280.12, 0.07 mol, 369.6 g) prepared above in PE1 and toluene (1000 mL) were charged into a 2 L flask and heated to azeotropically remove water for 30 minutes. Then methylene-bis(4-cyclohexylisocyanate) (0.0147 mol, 38.57 g) and dibutyltin dilaurate (0.05 g) were charged into the flask and the temperature was kept at 70° C. for 2 hours resulting in an diisocynate capped polymer. Then 1,4-butyl diol (0.07 mol, 6.31 g) was charged into the flask and the temperature was kept at 70° C. for another 4 hours resulting in a high-viscosity polymer solution. The polymer solution was poured into a polytetrafluoroethylene-coated pan and kept in an oven at 80° C. for 4 hours. A visibly transparent and colorless polymer resulted. Haze of the polymer was 1.5% when tested as described above.

Example 2

Polydiorganosiloxane diol (Mw=33960, 0.001 mol, 33.96 g) prepared above in PE2 and toluene (100 mL) was charged into a 250 mL flask and heated to azeotropically remove water for 30 minutes. Then methylene-bis(4-cyclohexylisocyanate) (0.0021 mol, 0.557 g) and dibutyltin dilaurate (0.03 g) was charged and the temperature was kept at about 70-80° C. for 2 hours resulting in a diisocynate capped polymer. Then 1,4-butyl diol (0.001 mol, 0.09 g) was charged into the flask and the temperature was kept at 70-80° C. for another 4 hours resulting in a high-viscosity polymer solution. The polymer solution was poured into a polytetrafluoroethylene-coated pan and kept in an oven at 80° C. for 4 hours. A visibly transparent and colorless polymer resulted. The reaction is shown in the scheme below:

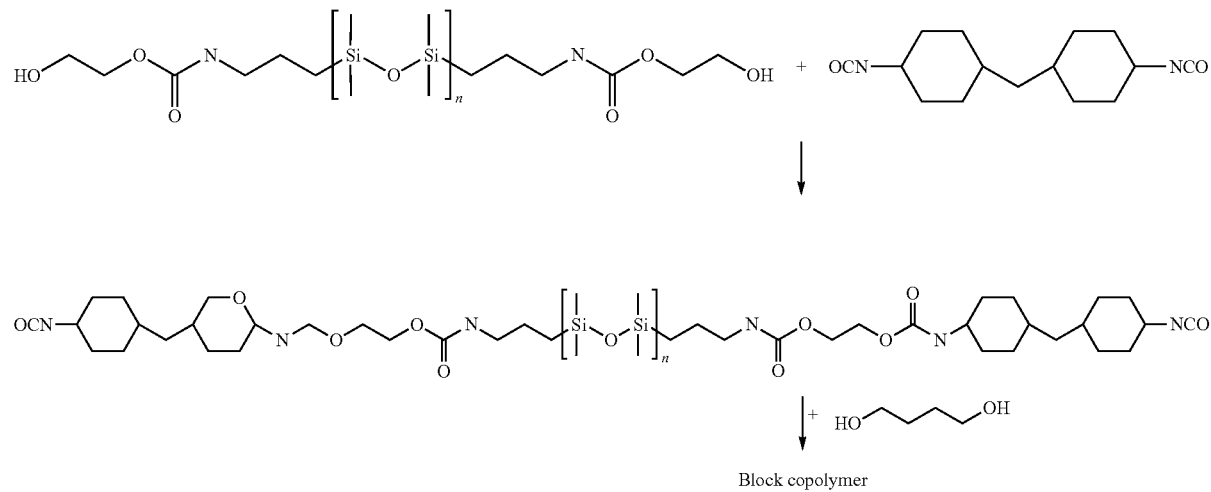

Block copolymer

Example 3

Polydiorganosiloxane diol (0.001 mol, 5.4343 g) prepared above in PE4, methylene-bis(4-cyclohexylisocyanate) (0.0022 mol, 0.578 g), dibutyltin dilaurate (0.1 g), and toluene (5 g) were mixed in a jar and heated to 60° C. and stirred for 2 hours resulting in an diisocynate capped polymer. Then 1,4-butanediol (0.091 g) was added and the mixture was heated for another 4 hours resulting in a high viscosity polymer solution. The polymer solution was poured into a polytetrafluoroethylene-coated pan and kept in an oven at 80° C. for 4 hours. A visibly transparent and colorless polymer resulted. The reaction is shown in the scheme below:

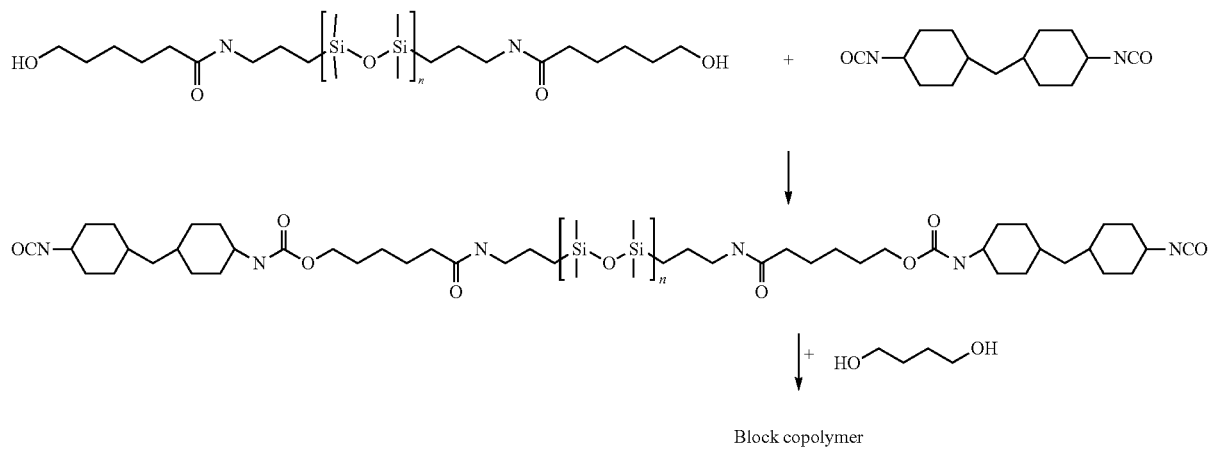

Block copolymer

FT-IR spectrum of the polymer sample showed absorption bands at 1724 cm$^{-1}$ and 1694 cm$^{-1}$ corresponding to urethane bonds and at 1633 cm$^{-1}$ corresponding to an amide.

Comparative Example 1

Polydiorganosiloxane diol (Mw=5280.12, 4.0 g) prepared above in PE1, methylene-bis(4-cyclohexylisocyanate) (0.585 g), 1,4-butyl diol (0.124 g), dibutyltin dilaurate (0.1 g), and toluene (10.98 g) were charged into a vial. The resulting reactant mixture was heated up to 80° C. for about 2 hours with stirring resulting in a high viscosity and cloudy solution. The reaction is shown in the scheme below:

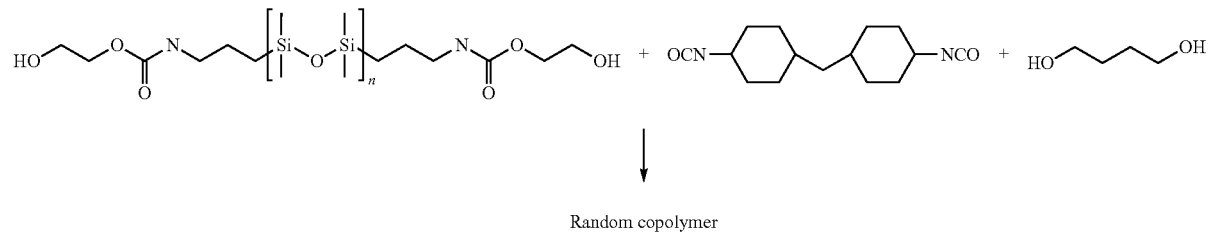

Random copolymer

The solution was cast into polytetrafluoroethylene-coated mold. A flexible, but tough, hazy polymer resulted. FT-IR spectrum of the polymer sample showed absorption bands at 1712 cm$^{-1}$ and 1698 cm$^{-1}$ corresponding to urethane bonds and at 3320 cm$^{-1}$ and 3333 cm$^{-1}$ corresponding to NH bonds. Haze of the polymer was 63.3% when tested as described above.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising a copolymer of Formula (I)

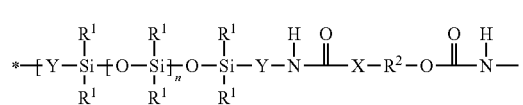

(I)

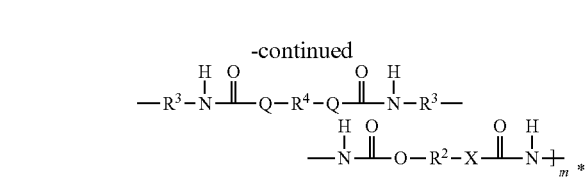

-continued wherein
each $R^1$ is independently an alkyl, haloalkyl, aralkyl, alkenyl, aryl, or aryl substituted with an alkyl, alkoxy, or halo;
each $R^2$ is independently an alkylene, alkylene substituted with an aryl, or a combination thereof;
each $R^3$ is independently an alkylene, arylene, arylene substituted with an alkyl, halo, oxy or carbodiimide group, haloaralkylene, cycloalkylene, cycloalkylene substituted with an carbodiimide group, or a combination thereof;
each $R^4$ is independently an alkylene, fluoroalkylene, alkylene oxide, aralkylene, fluoroalkylene oxide, or a combination thereof;
each X is independently an oxy or —CH$_2$—;
each Y is independently an alkylene, arylene, or a combination thereof;
Q is oxy or —NH—;
n is an integer in a range of 0 to 1500; and
m is an integer equal to at least 1.

2. The composition of claim 1, wherein each $R^1$ is methyl.

3. The composition of claim 1, wherein at least 50% of the $R^1$ groups are methyl.

4. The composition of claim 1, wherein $R^2$ is selected from at least one of ethylene, propylene, and butylene.

5. The composition of claim 1, wherein $R^3$ is selected from at least one of: phenylene, and methylenedicyclohexylene.

6. The composition of claim 1, wherein $R^4$ is selected from at least one of: n-butylene, and n-propylene.

7. The composition of claim 1, wherein Y is an alkylene having 1 to 4 carbon atoms.

8. The composition of claim 1, wherein n is at least 40.

9. The composition of claim 1, wherein m is 1 to 6.

10. An article comprising:
a first substrate; and
a polymeric layer adjacent to the substrate, the polymeric layer comprising a copolymer of Formula (I)

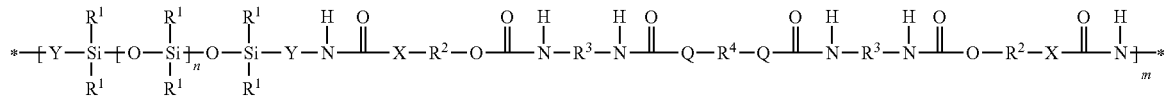

wherein
each $R^1$ is independently an alkyl, haloalkyl, aralkyl, alkenyl, aryl, or aryl substituted with an alkyl, alkoxy, or halo;
each $R^2$ is independently an alkylene, alkylene substituted with an aryl, or a combination thereof;
each $R^3$ is independently an alkylene, arylene, arylene substituted with an alkyl, halo, oxy or carbodiimide group, haloaralkylene, cycloalkylene, cycloalkylene substituted with an carbodiimide group, or a combination thereof;
each $R^4$ is independently an alkylene, fluoroalkylene, alkylene oxide, aralkylene, fluoroalkylene oxide, or a combination thereof;
each X is independently an oxy or —$CH_2$—;
each Y is independently an alkylene, arylene, or a combination thereof;
Q is oxy or —NH—;
n is an integer in a range of 0 to 1500; and
m is an integer equal to at least 1.

11. The article of claim 10, wherein the first substrate is selected from at least one of the following: polypropylene, polyethylene terephthalate, polycarbonate, acrylate, polymethylmethacrylate, polyvinyl chloride, nylon, and combinations thereof.

12. The article of claim 10, further comprising a second substrate and the polymeric layer is positioned between the first substrate and the second substrate.

13. A method of making a copolymer, the method comprising:
comprising a product of:
(a) providing a polydiorganosiloxane diamine of Formula (II)

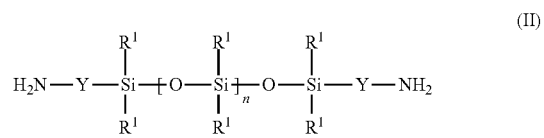

wherein each $R^1$ is independently an alkyl, haloalkyl, aralkyl, alkenyl, aryl, or aryl substituted with an alkyl, alkoxy, or halo;
each Y is independently an alkylene, arylene, or a combination thereof; and
n is an integer in a range of 0 to 1500;

(b) reacting the polydiorganosiloxane diamine of Formula (II) with a cyclic compound of Formula (III)

to form a polydiorganosiloxane diol of Formula (IV)

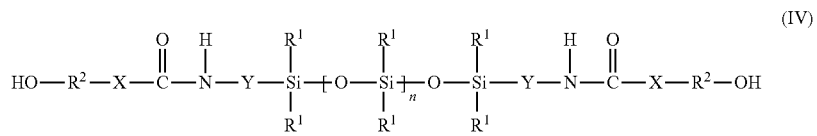

wherein
each $R^2$ is independently an alkylene, alkylene substituted with an aryl, or a combination thereof and X is independently an oxy or —$CH_2$—;

(c) reacting the polydiorganosiloxane diol of Formula (IV) with a diisocyanate of Formula (V)

to form a polydiorganosiloxane diisocyanate of Formula (VI)

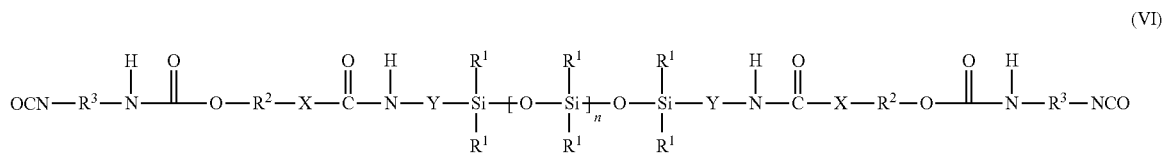

(VI)

wherein
- each $R^3$ is independently an alkylene, arylene, arylene substituted with an alkyl, halo, oxy or carbodiimide group, haloaralkylene, cycloalkylene, cycloalkylene substituted with an carbodiimide group, or a combination thereof; and
- (d) reacting the polydiorganosiloxane diisocyanate of Formula (VI) with a chain extender of Formula (VII)

(VII)

to form the copolymer of Formula (I)

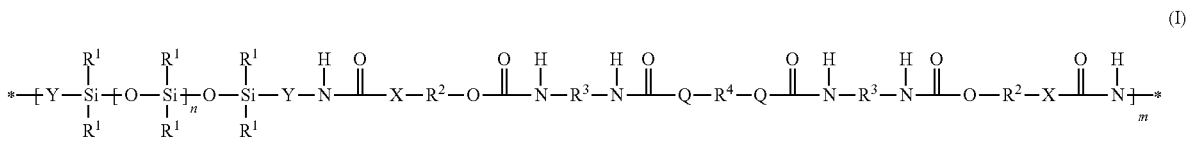

(I)

wherein
- each $R^4$ is independently an alkylene, fluoroalkylene, alkylene oxide, aralkylene, fluoroalkylene oxide, or a combination thereof;
- Q is oxy or —NH—; and
- m is an integer equal to at least 1.

14. The method of claim 13, wherein the cyclic compound of Formula (III) is selected from at least one of: carprolactone, valerolactone, ethylene carbonate, and propylene carbonate.

15. The method of claim 13, wherein the diisocyanate of Formula (V) is selected from at least one of: methylenedicyclohexylene-4,4'-diisocyanate, hexamethylene diisocyanate, and isophorone diisocyanate.

16. The method of claim 13, wherein the chain extender of Formula (VII) is selected from at least one of: 1,4-butanediol, 1,3-propanediol, 1,6-hexanediol, 1,3-cyclohexane dimethanol, and 1,4-cyclohexane dimethanol.

17. The method of claim 13, wherein polydiorganosiloxane diamine of Formula (II) has a number average molecular weight of 500 to 10,000 grams/mole.

18. The method of claim 13, wherein polydiorganosiloxane diamine of Formula (II) has a number average molecular weight of 30,000 to 50,000 grams/mole.

19. The method of claim 13, wherein the polymerization of the polydiorganosiloxane diisocyanate of Formula (VI) with the chain extender is prepared in the absence of a solvent.

20. The method of claim 13, further comprising extruding the copolymer of Formula (I) into a film.

* * * * *

UNITED STATES PATENT AND TRADEMARK OFFICE
CERTIFICATE OF CORRECTION

PATENT NO. : 9,701,783 B2
APPLICATION NO. : 14/430750
DATED : July 11, 2017
INVENTOR(S) : Yu Yang It is certified that error appears in the above-identified patent and that said Letters Patent is hereby corrected as shown below:

In the Specification

Column 2,
Line 51, delete "carbodiimide-group," and insert -- carbodiimide- group, --, therefor.

Column 9,
Line 40, delete "CF$_2$)$_m$O" and insert -- CF$_2$)$_n$O --, therefor.
Line 41, delete "CF$_2$)$_m$O" and insert -- CF$_2$)$_n$O --, therefor.

In the Claims

Column 24,

Lines 25 & 26, in Claim 1, delete " 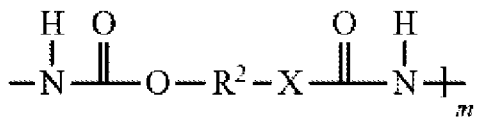 " and insert -- 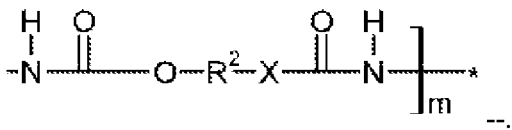 --.

Signed and Sealed this
Third Day of October, 2017

Joseph Matal
*Performing the Functions and Duties of the*
*Under Secretary of Commerce for Intellectual Property and*
*Director of the United States Patent and Trademark Office*